United States Patent
Hsu et al.

(10) Patent No.: US 12,328,365 B2
(45) Date of Patent: Jun. 10, 2025

(54) UART-HUB DESIGN FOR MULTIPLE DATA TRANSMISSION

(71) Applicant: MEDIATEK INC., Hsin-Chu (TW)

(72) Inventors: Chia-Hung Hsu, Hsinchu (TW); Cheng-Hao Yao, Hsinchu (TW); Jyun-Ji Wang, Hsinchu (TW); Yu-Lin Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 14 days.

(21) Appl. No.: 18/221,402

(22) Filed: Jul. 13, 2023

(65) Prior Publication Data

US 2024/0031438 A1 Jan. 25, 2024

Related U.S. Application Data

(60) Provisional application No. 63/368,898, filed on Jul. 20, 2022, provisional application No. 63/439,161, filed on Jan. 16, 2023.

(51) Int. Cl.
*H04L 67/12* (2022.01)
*G06F 13/42* (2006.01)
*H04L 69/22* (2022.01)

(52) U.S. Cl.
CPC .......... *H04L 67/12* (2013.01); *G06F 13/4213* (2013.01); *G06F 13/4282* (2013.01); *H04L 69/22* (2013.01)

(58) Field of Classification Search
CPC ..... H04L 67/12; H04L 69/22; G06F 13/4213; G06F 13/4282
See application file for complete search history.

(56) References Cited

U.S. PATENT DOCUMENTS

| | | | |
|---|---|---|---|
| 2005/0132111 A1* | 6/2005 | Bar-Or | H04L 25/45 710/106 |
| 2016/0029318 A1* | 1/2016 | Gulati | H04W 52/0212 455/574 |
| 2016/0335127 A1* | 11/2016 | Artmeier | G06F 9/5044 |
| 2017/0177529 A1* | 6/2017 | Staudenmaier | G06F 13/385 |
| 2020/0026682 A1* | 1/2020 | Thomas | G06F 11/1417 |
| 2021/0014342 A1* | 1/2021 | Han | H04L 69/22 |
| 2021/0243035 A1* | 8/2021 | Ruane | H04L 9/0897 |

FOREIGN PATENT DOCUMENTS

TW 200849865 12/2008

\* cited by examiner

*Primary Examiner* — Henry Tsai
*Assistant Examiner* — Harry Z Wang
(74) *Attorney, Agent, or Firm* — Winston Hsu

(57) ABSTRACT

The present invention provides a chip including a plurality of application circuits and a UART interface. The plurality of application circuits, configured to generate a plurality of data, respectively, wherein the plurality of data respectively generated by the plurality of application circuits are transmitted to another chip via the same UART interface.

9 Claims, 4 Drawing Sheets

UART-HUB DESIGN FOR MULTIPLE DATA TRANSMISSION

CROSS REFERENCE TO RELATED APPLICATIONS

This application claims the benefit of U.S. Provisional Application No. 63/368,898, filed on Jul. 20, 2022. Further, this application claims the benefit of U.S. Provisional Application No. 63/439,161, filed on Jan. 16, 2023. The contents of these applications are incorporated herein by reference.

BACKGROUND

In a multi-chip design, two or more data interfaces are required for communications between two chips when the chips have multiple applications. For example, if the chip has three applications, the chip will have three universal asynchronous receiver/transmitter (UART) interfaces, wherein each UART interface corresponds to one application. Therefore, since the chip needs at least three UART interfaces and the other interface(s) such as a sideband interface, the chip needs to design many pins for the communications, causing an increase in manufacturing costs.

SUMMARY

It is therefore an objective of the present invention to provide a chip having a UART hub, which can use one UART interface to transmit data of multiple applications to another other chip, to solve the above-mentioned problems.

According to one embodiment of the present invention, a chip comprising a plurality of application circuits and a UART interface is disclosed. The plurality of application circuits, configured to generate a plurality of data, respectively, wherein the plurality of data respectively generated by the plurality of application circuits are transmitted to another chip via the same UART interface.

According to one embodiment of the present invention, a multi-chip system, comprising a first chip and a second chip is disclosed. The first chip comprises a plurality of first application circuits and a first UART interface, and the second chip comprises a plurality of second application circuits and a second UART interface. The plurality of first application circuits are configured to generate a plurality of first data, respectively, wherein the plurality of first data respectively generated by the plurality of first application circuits are transmitted to the second chip via the same first UART interface. The plurality of second application circuits are configured to generate a plurality of second data, respectively, wherein the plurality of second data respectively generated by the plurality of second application circuits are transmitted to the first chip via the same second UART interface.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
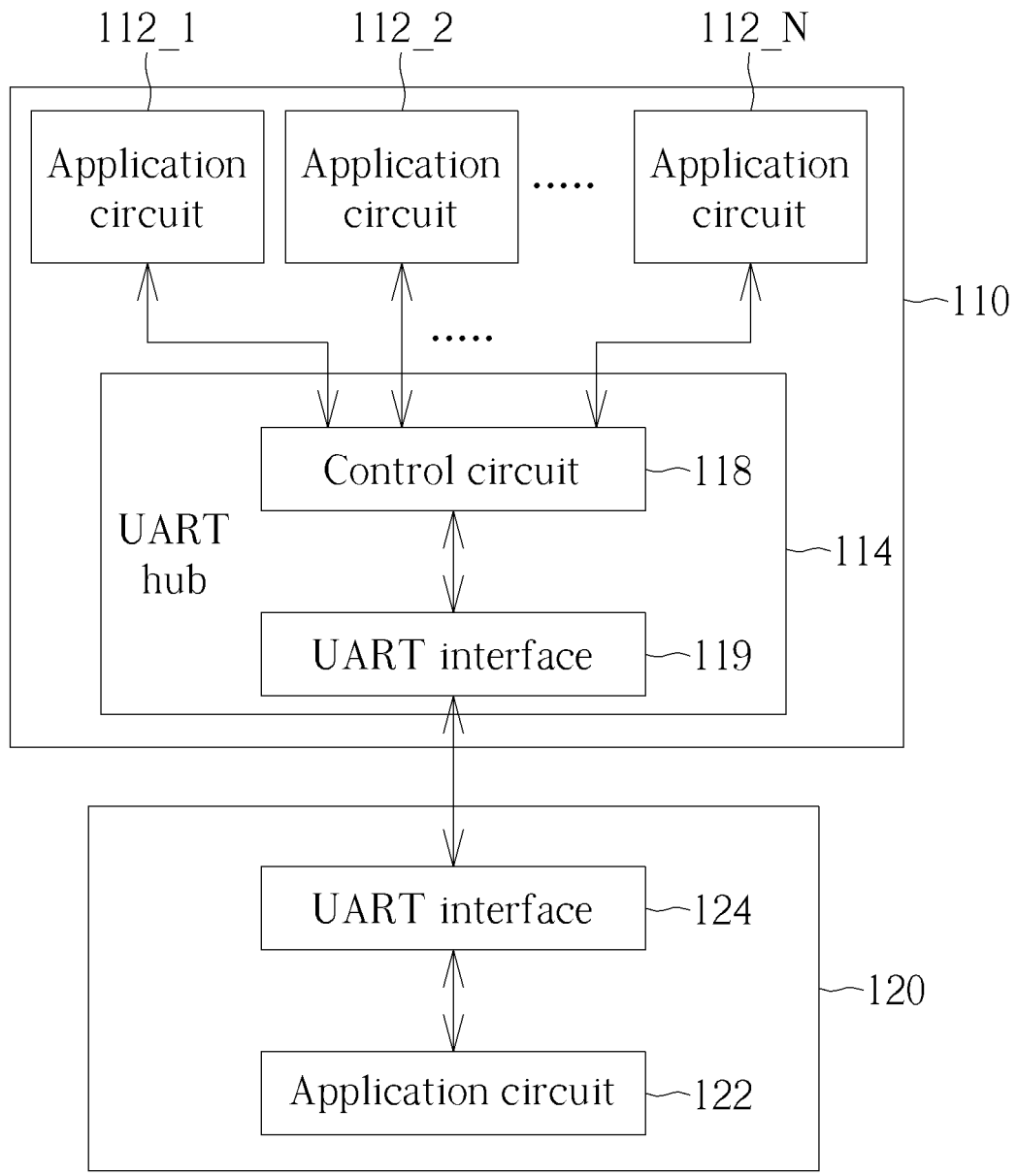
FIG. 1 is a diagram illustrating a multi-chip system according to one embodiment of the present invention.

FIG. 1 is a diagram illustrating a multi-chip system according to one embodiment of the present invention. As shown in FIG. 1, the multi-chip system comprises a first chip 110 and a second chip 120, wherein the first chip 110 and the second chip 120 are mounted on a printed circuit board, and the first chip 110 and the second chip 120 can communicate with each other by using UART interfaces. The first chip 110 comprises a plurality of application circuits 112_1-112_N and a UART hub 114, wherein the UART hub 114 comprises a control circuit 118 and a UART interface 119. The second chip 120 comprises an application circuit 122 and a UART interface 124. In one embodiment, the multi-chip system can be applied in a wireless communication, for example, the first chip 110 is an application processor, and the second chip 120 is a wireless communication chip capable of wirelessly transmitting the data provided by the first chip 110. In addition, the application circuits 112_1-112_N can be core circuits with different functions, for example, the application circuit 112_1 may be a Wi-Fi circuit capable of generating Wi-Fi payload, the application circuit 112_2 may be a Bluetooth circuit capable of generating Bluetooth data, and the application circuit 112_N may be an audio processing circuit capable of generating audio data.

In the embodiment shown in FIG. 1, the data generated by the application circuits 112_1-112_N is transmitted to the second chip 120 by using the UART hub 114. For example, the control circuit 118 may use a round-robin scheduling to process the data of the application circuits 112_1-112_N, that is, time slices are assigned to each application circuit 112_1-112_N in circular order, and the data of the application circuits 112_1-112_N are performed as cyclic executive. In this embodiment, without a limitation of the present invention, the UART interface 119 has a plurality of pins, and only two pins are required for the bidirectional communication with the second chip 120. For example, the UART interface 119 has only one transmitter pin (TX pin) and only one receiver pin (RX pin), wherein the first chip 110 transmits data to the second chip 120 via the TX pin only, and the first chip 110 receives data from the second chip 120 via the RX pin only. Therefore, because the first chip 110 uses only one UART interface 119 to transmit the data of many application circuits 112_1-112_N to the second chip 120, the pin count of the first chip 110 can be reduced to lower the manufacturing costs.

In one embodiment, the control circuit 118 packs every data provided by the application circuits 112_1-112_N so that the second chip 120 can identify which application circuit generated the received data. Taking FIG. 2 as an example, after receiving data from one of the application circuits 112_1-112_N, the control circuit packs this data to generate a packet 200 having a header, a payload and a cyclic redundancy check (CRC), wherein the header comprises a length of the packet 200 and information that can be used to identify which application circuit the packet 200 belongs to, the payload is the data received from one of the application circuits 112_1-112_N, and the CRC is an error-detection code that is used to detect if the packet 200 has an error. Then, the control circuit 118 transmits the packet to the second chip 120 via the UART interface 119.

In one embodiment, the first chip 110 and the second chip 120 may use a packet retransmission protocol. For example, when the application circuit 112_1 transmits the data to the second chip 120 via the UART hub 114, the application circuit 112_1 can confirm that the data is correctly received by the chip 120 only when receiving an acknowledgement from the chip 120; and if no acknowledgment from the second chip 120 is received after a period of time, a retransmission mechanism is triggered, and the application circuit 112_1 transmits the data to the second chip 120 again.

Figure 3:
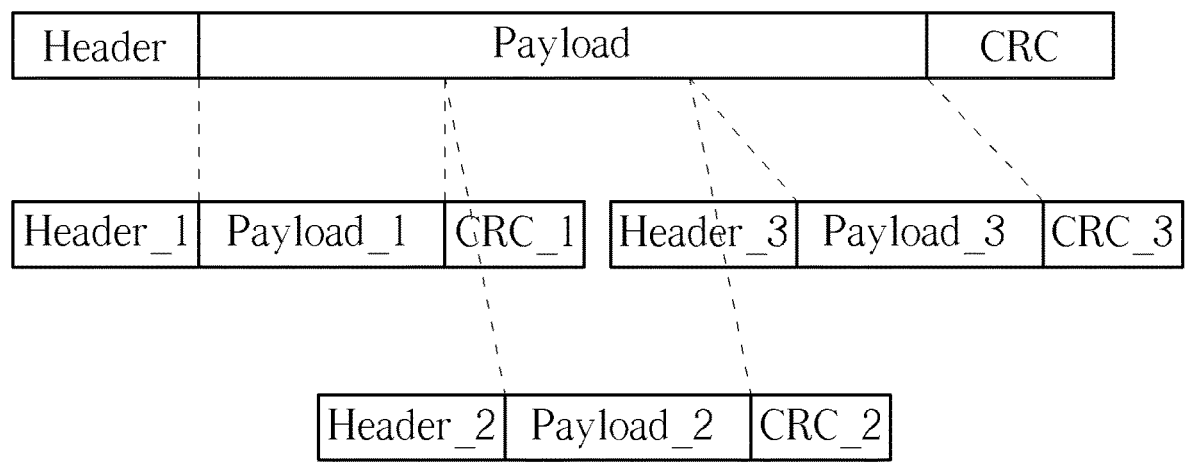
FIG. 3 is a diagram of shorten a packet size according to one embodiment of the present invention.

In addition, because only one UART interface 119 is used to transmit the data of the application circuits 112_1-112_N, each application circuit can only be allocated part of the data transmission time, so that the data transmission may suffer extra latency. To solve this problem, a baud rate of the UART interface 119 can be increased, and/or a packet size of each packet can be reduced, to shorten the packet transmission time. Taking FIG. 3 as an example, the control circuit 118 can divide the original payload into three parts, and each part forms a packet for transmission. That is, a first packet comprises a first header comprising a length and the information of the packet, a first payload (i.e., the first part of the original payload), and a first CRC; a second packet comprises a second header comprising a length and the information of the packet, a second payload (i.e., the second part of the original payload), and a second CRC; and a third packet comprises a third header comprising a length and the information of the packet, a third payload (i.e., the third part of the original payload), and a third CRC. Then, the first packet, the second packet and the third packet are transmitted to the second chip 120 in sequence.

In one embodiment, one or more sideband signals may be communicated between the first chip 110 and the second chip 120, and these sideband signals may be transmitted by using the UART hub 114, wherein the sideband signal may be a wake-up signal that is used to wake up a device from a sleep mode. Specifically, the first chip 110 may transmit a wake-up signal to wake up the second chip 120 via the UART hub 114, and because the wake-up signal is generally a signal with special pattern, the control circuit 118 can directly transmit this wake-up signal to the second chip 120 via the UART interface 119, without packing the wake-up signal first. Therefore, because the first chip 110 does not need to design another pin for transmitting the sideband signal, the pin count of the first chip 110 can be further reduced.

Figure 4:
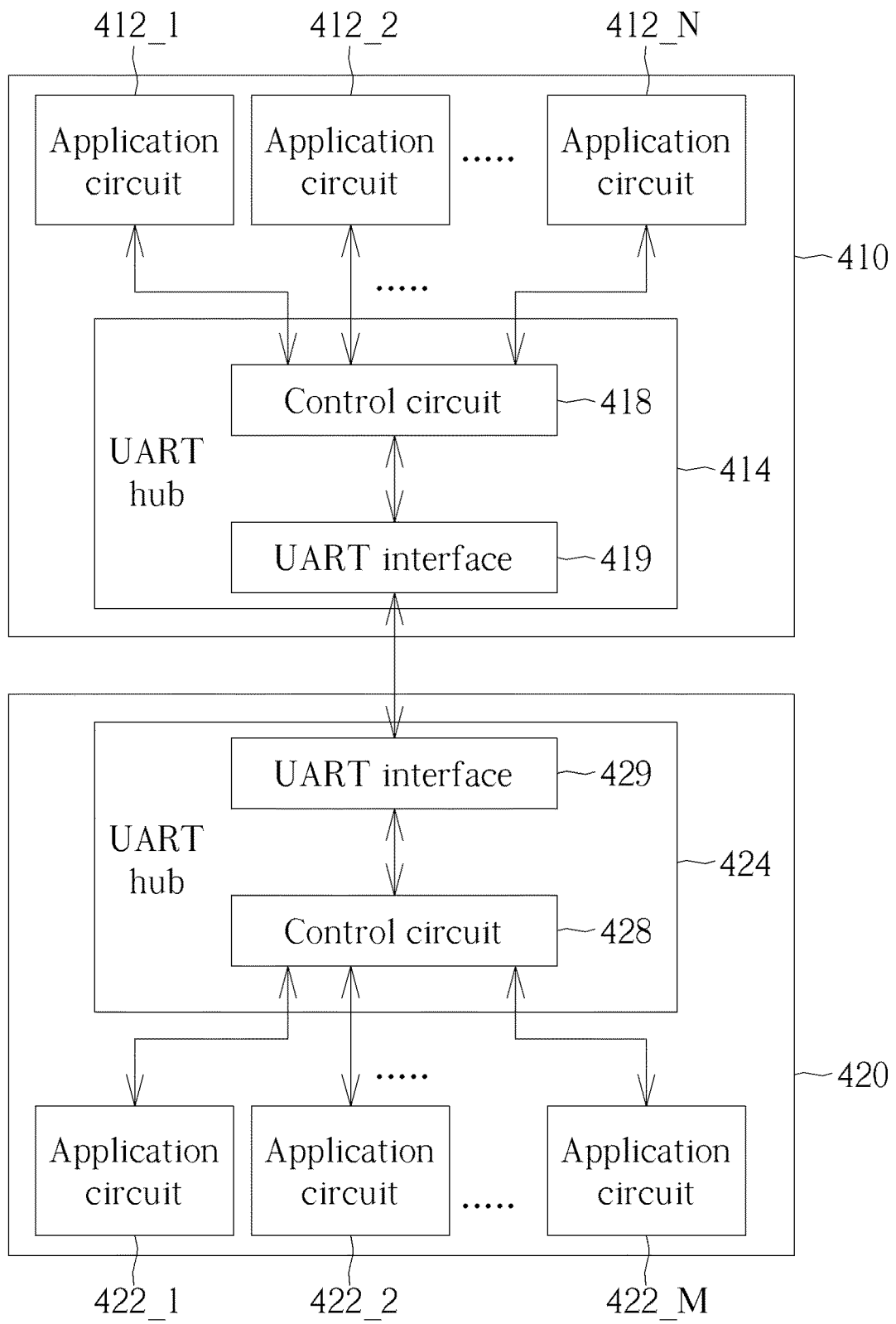
FIG. 4 is a diagram illustrating a multi-chip system according to one embodiment of the present invention.

FIG. 4 is a diagram illustrating a multi-chip system according to one embodiment of the present invention. As shown in FIG. 4, the multi-chip system comprises a first chip 410 and a second chip 420, wherein the first chip 410 and the second chip 420 are mounted on a printed circuit board, and the first chip 410 and the second chip 420 can communicate with each other by using UART interfaces. The first chip 410 comprises a plurality of application circuits 412_1-412_N and a UART hub 414, wherein the UART hub 414 comprises a control circuit 418 and a UART interface 419. The second chip 420 comprises a plurality of application circuits 422_1-422_M and a UART hub 424, wherein the UART hub 424 comprises a control circuit 428 and a UART interface 429. In one embodiment, the multi-chip system can be applied in a wireless communication, for example, the first chip 410 is an application processor, and the second chip 420 is a wireless communication chip capable of wirelessly transmitting the data provided by the first chip 410. In addition, the application circuits 412_1-412_N in the first chip 410 can be core circuits with different functions, for example, the application circuit 412_1 may be a Wi-Fi circuit capable of generating Wi-Fi payload, the application circuit 412_2 may be a Bluetooth circuit capable of generating Bluetooth data, and the application circuit 412_N may be an audio processing circuit capable of generating audio data. In addition, the application circuits 422_1-422_M in the second chip 420 can be core circuits with different functions.

In the embodiment shown in FIG. 4, the data generated by the application circuits 412_1-412_N is transmitted to the second chip 420 by using the UART hub 414. For example, the control circuit 418 may use a round-robin scheduling to process the data of the application circuits 412_1-412_N, that is, time slices are assigned to each application circuit 412_1-412_N in circular order, and the data of the application circuits 412_1-412_N are performed as cyclic executive. In this embodiment, without a limitation of the present invention, the UART interface 419 has a plurality of pins, and only two pins are required for the bidirectional communication with the second chip 420. For example, the UART interface 419 has only one TX pin and only one RX pin, wherein the first chip 410 transmits data to the second chip 420 via the TX pin only, and the first chip 410 receives data from the second chip 420 via the RX pin only. Therefore, because the first chip 410 uses only one UART interface 419 to transmit the data of many application circuits 412_1-412_N to the second chip 420, the pin count of the first chip 410 can be reduced to lower the manufacturing costs.

Similarly, the data generated by the application circuits 422_1-422_M is transmitted to the first chip 410 by using the UART hub 424. For example, the control circuit 428 may use the round-robin scheduling to process the data of the application circuits 422_1-422_M. In this embodiment, without a limitation of the present invention, the UART interface 429 has a plurality of pins, and only two pins are required for the bidirectional communication with the first chip 410. For example, the UART interface 429 has only one TX pin and only one RX pin, wherein the second chip 420 transmits data to the first chip 410 via the TX pin only, and the second chip 420 receives data from the first chip 410 via the RX pin only. Therefore, because the second chip 420 uses only one UART interface 429 to transmit the data of many application circuits 422_1-422_M to the first chip 410, the pin count of the second chip 420 can be reduced to lower the manufacturing costs.

Figure 2:
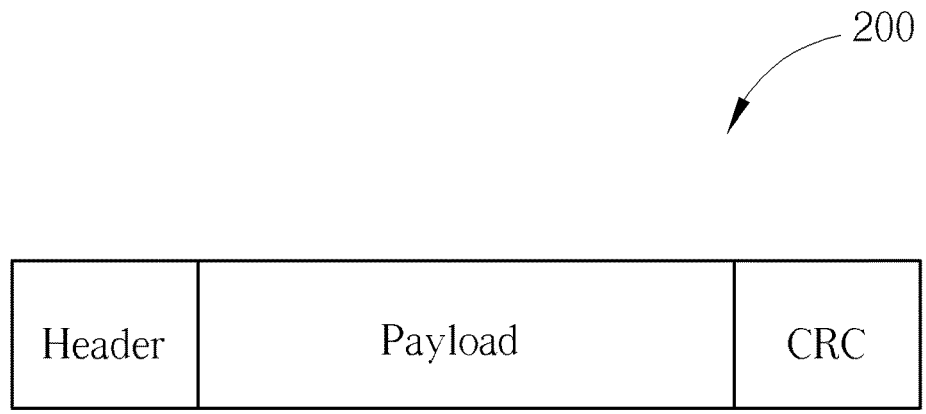
FIG. 2 is a packet generated by a control circuit of a UART hub according to one embodiment of the present invention.

In one embodiment, the control circuit 418 packs every data provided by the application circuits 412_1-412_N so that the second chip 420 can identify which application circuit generated the received data. In detail, after receiving data from one of the application circuits 412_1-412_N, the control circuit 418 packs this data to generate a packet having a header, a payload and a CRC as shown in FIG. 2, then the control circuit 418 transmits the packet to the second chip 420 via the UART interface 419. Similarly, for the second chip 420, the control circuit 428 packs every data provided by the application circuits 422_1-422_M so that the first chip 410 can identify which application circuit generated the received data. In detail, after receiving data from one of the application circuits 422_1-422_M, the control circuit 428 packs this data to generate a packet having a header, a payload and a CRC as shown in FIG. 2, then the control circuit 428 transmits the packet to the first chip 410 via the UART interface 429.

In one embodiment, one or more sideband signals may be communicated between the first chip 410 and the second chip 420, and these sideband signals may be transmitted by using the UART hub 414, wherein the sideband signal may be a wake-up signal that is used to wake up a device from a sleep mode. Specifically, when the first chip 410 needs to transmit a wake-up signal to wake up the second chip 420, the control circuit 418 can directly transmit this wake-up signal to the second chip 420 via the UART interface 419, without packing the wake-up signal first. Therefore, because the first chip 410 and the second chip 420 does not need to design another pin for transmitting the sideband signal, the pin counts of the first chip 410 and the second chip 420 can be further reduced.

Figure 5:
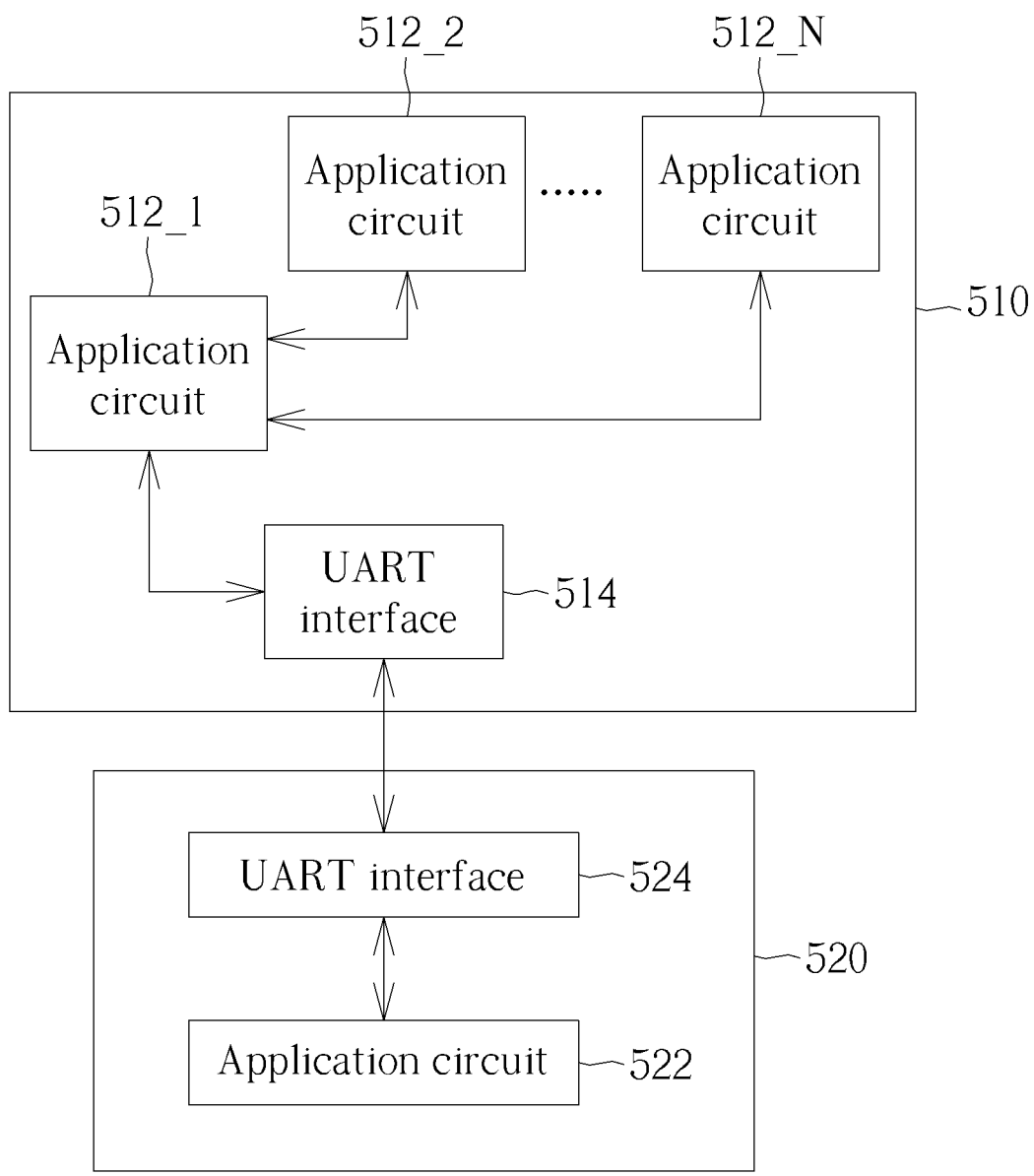
FIG. 5 is a diagram illustrating a multi-chip system according to one embodiment of the present invention.

FIG. 5 is a diagram illustrating a multi-chip system according to one embodiment of the present invention. As shown in FIG. 5, the multi-chip system comprises a first chip 510 and a second chip 520, wherein the first chip 510 and the second chip 520 are mounted on a printed circuit board, and the first chip 510 and the second chip 520 can communicate with each other by using UART interfaces. The first chip 510 comprises a plurality of application circuits 512_1-512_N and a UART interface 514. The second chip 520 comprises an application circuit 522 and a UART interface 524. In one embodiment, the multi-chip system can be applied in a wireless communication, for example, the first chip 510 is an application processor, and the second chip 520 is a wireless communication chip capable of wirelessly transmitting the data provided by the first chip 510. In addition, the application circuits 512_1-512_N can be core circuits with different functions.

In the embodiment shown in FIG. 1, the data generated by the application circuits 512_1-512_N is transmitted to the second chip 120 by using the UART interface 514. For example, the application circuit 512_1 may receive the data from the application circuits 512_2-512_N, and the application circuit 512_1 may schedule the data of the application circuits 512_1-512_N, such as using the round-robin scheduling to process the data, to transmit the data of the application circuits 512_1-512_N to the second chip 510. In this embodiment, without a limitation of the present invention, the UART interface 514 has a plurality of pins, and only two pins are required for the bidirectional communication with the second chip 520. For example, the UART interface 514 has only one TX pin and only one RX pin, wherein the first chip 510 transmits data to the second chip 520 via the TX pin only, and the first chip 510 receives data from the second chip 520 via the RX pin only. Therefore, because the first chip 510 uses only one UART interface 514 to transmit the data of many application circuits 512_1-512_N to the second chip 520, the pin count of the first chip 510 can be reduced to lower the manufacturing costs.

In one embodiment, one or more sideband signals may be communicated between the first chip 510 and the second chip 520, and these sideband signals may be transmitted by using the UART interface 514, wherein the sideband signal may be a wake-up signal that is used to wake up a device from a sleep mode. Therefore, because the first chip 510 does not need to design another pin for transmitting the sideband signal, the pin count of the first chip 510 can be further reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-chip system, comprising:
   a first chip, comprising:
      a plurality of first application circuits, configured to generate a plurality of first data, respectively; and
      a first universal asynchronous receiver/transmitter (UART) interface;
   a second chip, comprising:
      a plurality of second application circuits, configured to generate a plurality of second data, respectively; and
      a second UART interface;
   wherein the plurality of first data respectively generated by the plurality of first application circuits are transmitted to the second chip via the same first UART interface; and the plurality of second data respectively generated by the plurality of second application circuits are transmitted to the first chip via the same second UART interface.

2. The multi-chip system of claim 1, wherein the first chip comprises a first UART hub, and the first UART hub comprises a first control circuit and the first UART interface; and the first control circuit schedules the plurality of first data respectively generated by the plurality of first application circuits, and transmits the plurality of first data to the second chip via the first UART interface.

3. The multi-chip system of claim 2, wherein the second chip comprises a second UART hub, and the second UART hub comprises a second control circuit and the second UART interface; and the second control circuit schedules the plurality of second data respectively generated by the plurality of second application circuits, and transmits the plurality of second data to the first chip via the second UART interface.

4. The multi-chip system of claim 2, wherein the first control circuit packs each of the plurality of first data to generate a packet, and transmits the packet to the second chip via the first UART interface.

5. The multi-chip system of claim 4, wherein the packet comprises a header, a payload and a cyclic redundancy check (CRC), the header comprises a length of the packet and information that can be used to identify which first application circuit the packet belongs to, the payload is the data.

6. The multi-chip system of claim 1, wherein the first UART interface comprises only one transmitter pin and only one receiver pin, the first chip transmits the plurality of first data to the second chip via the transmitter pin only, and the first chip receives the plurality of second data from the second chip via the receiver pin only.

7. The multi-chip system of claim 6, wherein the second UART interface comprises only one transmitter pin and only one receiver pin, the second chip transmits the plurality of second data to the first chip via the transmitter pin of the second UART interface only, and the second chip receives the plurality of first data from the first chip via the receiver pin of the second USRT interface only.

8. The multi-chip system of claim 1, wherein the plurality of first application circuits are core circuits with different functions.

9. The multi-chip system of claim 8, wherein the plurality of first application circuits comprise at least two of Wi-Fi circuit, Bluetooth circuit and audio circuit.

* * * * *